Patented Dec. 4, 1945

2,390,281

UNITED STATES PATENT OFFICE 2,390,281

BRUCINE-LACTONE COMPOUND

Max Tishler, Rahway, and Ralph H. Beutel, Newark, N. J., assignors to Merck & Co., Inc., Rahway, N. J., a corporation of New Jersey No Drawing. Application November 27, 1943, Serial No. 512,056

5 Claims. (Cl. 260—236)

This invention relates generally to improvements in processes for preparing growth-promoting substances having the physiological activity of pantothenic acid; in a more limited sense, it is concerned with a novel method for separating stereoisomeric forms of an intermediate used in synthesizing said substances.

In accordance with one method for preparing pantothenic acid or its derivatives possessing similar physiological activity, β-alanine or a compound capable of yielding β-alanine is condensed with laevorotatory α-hydroxy-β,β-dimethyl- gamma-butyrolactone or a chemical equivalent thereof. In this condensation, if the dextro-rotatory form of the lactone is used, the product does not possess the desired physiological activity hence resolution of the racemic lactone obtained by synthetic means is essential before condensation if satisfactory yields of the desired product are to be obtained.

According to one aspect of the present invention, the racemic synthetic lactone is resolved into its stereoisomers by reacting the racemic compound per se with brucine alkaloid under conditions such that salt formation does not occur. The laevorotatory lactone forms a complex with brucine that can be isolated readily.

The complex can be represented by the formula:

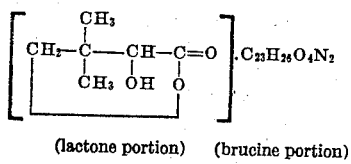

(lactone portion)   (brucine portion)

In addition to this complex another type of brucine compound can be prepared, namely: brucine-α-gamma-dihydroxy-β-β-dimethylbutyrate which is formed by metathesis when an aqueous solution of barium α-gamma-dihydroxy-β-β-dimethyl-butyrate (derived from the laevorotatory lactone) is mixed with brucine sulfate.

The properties of these two compounds are contrasted in the following table.

| | | Complex | True salt |
|---|---|---|---|
| (α) (HCCl₃) | degrees | −87.5 | −3.25 |
| Melting point | | 211–212 | 213–214 |

| | For $C_6H_{10}O_3.C_{23}H_{26}O_4N_2$ | | For $C_6H_{12}O_4.C_{23}H_{26}O_4N_2$ | |
|---|---|---|---|---|
| | Calculated | Found | Calculated | Found |
| Elementary analysis: | | | | |
| C percent | 66.39 | 66.52 | 64.19 | 64.14 |
| H percent | 6.92 | 6.96 | 7.06 | 6.68 |
| N percent | 5.34 | 5.51 | 5.16 | 4.98 |
| Solubility: | | | | |
| Hot ethanol (95%) | 1:8 | | 1:22 | |
| Water | Sl. sol | | V. sol | |
| Ethyl acetate | V. s | | S. s | |
| pH (aq. soln.) | Alkaline | | Neutral | |
| Mols brucine per mol of compound | 1 | | 1 | |

The reaction between brucine base and the l-lactone to produce the complex occurs most easily in a solvent capable of dissolving the reactants. It is desirable, however, that the solvent be selected so that the reaction product is but slightly soluble, or relatively slightly soluble, therein, thus causing separation of the complex. Ethanol is satisfactory for this purpose, either in anhydrous or usual commercial (95%) state. If desired, however, the complex can be formed in other solvents, for instance, water, ethyl acetate, dioxane and chloroform. When water is used, the reaction mixture is agitated during reaction to assure continued suspension of particles of the but slightly soluble brucine. When chloroform is used, the complex can be readily precipitated by addition of a solvent such as ether.

The following examples illustrate methods of carrying out the present invention, but it is to be understood that these examples are given by way of illustration and not of limitation.

Example 1

About 46.6 g. of brucine base are dissolved in approximately 93 cc. of ethanol (95%) at somewhat above room temperature, say about 50° C., and approximately 46.6 g. of racemic α-hydroxy-β-β-dimethyl-gamma-butyrolactone (dissolved in acetone to give a solution of about 50% by weight concentration) are added. The solution is cooled for about one and a half hours, and the crystalline material which is formed is removed from the supernatant liquid, washed with ethanol (95%) and dried in vacuo at about 25° C. for approximately two hours. The product is the purified brucine-1-lactone complex.

The 1-lactone is obtained from the brucine-1-lactone complex by treatment with a base such as aqueous sodium hydroxide, extraction with chloroform, ethylene dichloride or the like to remove the alkaloid. The aqueous solution is then acidified, heated, cooled and the lactone extracted with ether or benzene. The extract is washed with dilute acid and evaporated to recover the lactone.

Alternatively, the 1-lactone is obtained from the complex by treatment with an acid such as hydrochloric, sulfuric, phosphoric and the like, and extraction with ether, benzene or the like to remove the lactone. The extract is washed with dilute acid and evaporated to recover the lactone.

Example 2

About 25.3 g. of brucine sulfate are dissolved in approximately 250 cc. of hot water, neutralized with a stoichiometric quantity of sodium hydroxide and, after cooling to about 25° C., approximately 13 g. of racemic α-hydroxy-β-β-dimethyl-gamma-butyrolactone are added and the mixture stirred for 18 hours. The precipitate, the 1-lactone brucine complex, is removed, washed, and dried as in Example 1.

Example 3

About 23.3 g. of brucine base are dissolved in approximately 233 cc. of hot ethyl acetate, and about 13 g. of racemic α-hydroxy-β-β-dimethyl-gamma-butyrolactone are added. After cooling and filtering, the precipitated 1-lactone brucine complex is washed and dried as in Example 1.

Example 4

The procedure and proportions of reactants set forth in Example 3 are used but an equal volume of dioxane is substituted for the ethyl acetate there used. The product is isolated as in the said example. Chloroform can also be substituted in the procedure for the ethyl acetate and the complex precipitated by the addition of ether.

Modifications may be made in carrying out the present invention without departing from the spirit and scope thereof and the invention is to be limited only by the appended claims.

What is claimed is:

1. The process that includes the step comprising reacting racemic α-hydroxy-β-β-dimethyl-gamma-butyrolactone with brucine in an essentially inert, neutral liquid solvent and removing the brucine-1-lactone complex formed.

2. The process that includes the step comprising reacting racemic α-hydroxy-β-β-dimethyl-gamma-butyrolactone with brucine in alcohol and removing the brucine-1-lactone complex formed.

3. The process that includes the step comprising reacting racemic α-hydroxy-β-β-dimethyl-gamma-butyrolactone with brucine in ninety-five percent alcohol at about 50° C., cooling, and removing crystalline material formed.

4. A composition of matter represented by the formula:

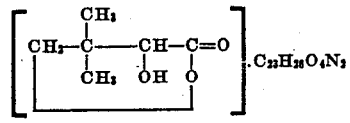

5. A brucine-1-α-hydroxy-β-β-dimethyl-gamma-butyrolactone complex melting at about 210° C., and having the optical rotation of about $[\alpha]_D = -87°$ when measured in 2% chloroform solution.

MAX TISHLER.
RALPH H. BEUTEL.